Nov. 27, 1923.

S. F. BORKEY

PISTON RING

Filed Feb. 6, 1922

1,475,680

Inventor
Stephen F. Borkey

By Whittemore, Hulbert, Whittemore, and Belknap
Attorneys

Patented Nov. 27, 1923.

1,475,680

UNITED STATES PATENT OFFICE.

STEPHEN F. BORKEY, OF DETROIT, MICHIGAN.

PISTON RING.

Application filed February 6, 1922. Serial No. 534,394.

*To all whom it may concern:*

Be it known that I, STEPHEN F. BORKEY, a citizen of the United States of America, residing at Detroit, in the county of Wayne and State of Michigan, have invented certain new and useful Improvements in Piston Rings, of which the following is a specification, reference being had therein to the accompanying drawings.

This invention relates to piston rings and more especially to piston rings having sealing members of relatively soft metal and hard spring steel members for placing the sealing members under proper stress.

It is the object of the invention to provide a piston ring in which the sealing member will not only be outwardly stressed by the spring steel member but will further be strongly reinforced by the latter against shear.

A further object of the invention is to provide a piston ring that may be formed from standard materials without expensive machine operations and at a very considerable saving of time and labor as compared to present practice.

More specifically it is the object of the invention to provide a piston ring comprising a rolled sealing member formed of a relatively soft steel and a rolled stressing member formed of relatively hard spring steel, the latter member being encased within the former and proportioned to bear both peripherally and laterally upon the sealing member, so as to reinforce the latter against lateral stress or shear, as well as maintaining the sealing pressure.

In the drawings:—

Figure 2:
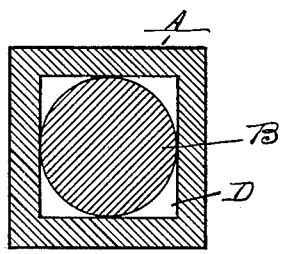
Figure 2 is a cross section view of the same.
Figure 3:
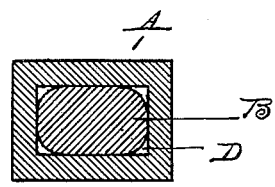
Figure 3 is a cross section view of a modified construction.
Figure 1:
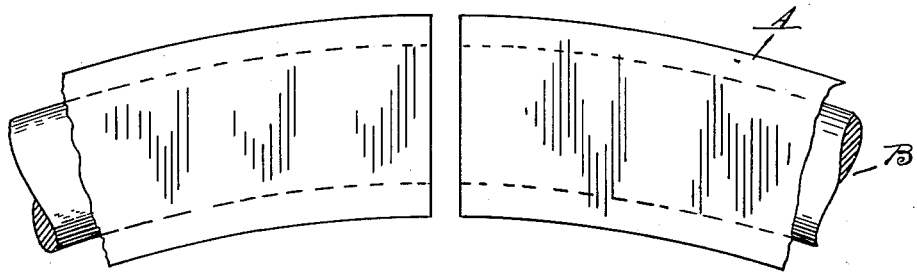
Figure 1 is an elevation view of a portion of a piston ring embodying the invention, said portion including the joint between the ends of the ring.

In these views the reference character A designates a sealing member formed preferably of cold drawn seamless steel tubing, of a rectangular cross section either square as disclosed in Figure 2, or oblong as Figure 3 illustrates. The reference character B designates a rod, or wire formed of a highly elastic spring steel, such for example as heat treated nickel-vanadium steel, said member B being snugly fitted within the tubular member A and serving both to reinforce the latter and to subject the same to the necessary outward stress.

The preferred method of manufacture of the described article comprises inserting long lengths of the spring steel rod within corresponding lengths of the seamless tubing, then cutting the two together into proper sizes for the formation of piston rings, rolling these sections to the correct circular form with the ends of the rolled section in close proximity and finally grinding the exterior faces of the sealing member A to the proper degree of smoothness.

The described piston ring is applicable to the pistons of steam, gas or gasoline engines and has a particular application to machines in which the piston and its rings are subjected to heavy stress, as for example steam hammers. When the piston rings of a steam hammer of other heavy duty engines are sheared due to the heavy stresses acting on the same, the pieces are likely to be ground into the bearing faces of the cylinder scoring the same deeply and necessitating shutting down of the engine and expensive repairs. With the above described construction the shearing stresses are transmitted from the relatively soft sealing member to the hard steel reinforcement B which is of ample strength to resist such stresses.

An additional advantage of the described construction lies in the provision of the spaces D within the outer tubular member between the same and the reinforcement B into which spaces the lubricant employed upon the piston will enter under pressure of the steam or gas, forming a reserve which may be drawn upon in case the supply of lubricant to the piston is permitted to run low.

What I claim as my invention is:—

1. A piston ring comprising a seamless metallic tubular sealing member, and a relatively hard spring steel member internally reinforcing said sealing member and outwardly stressing the same.

2. A piston ring, comprising a sealing member formed of cold drawn seamless steel tubing, and a reinforcing member within said sealing member formed of a highly elastic spring steel.

3. A piston ring comprising a tubular metallic sealing member of substantially rectangular cross section and a relatively hard spring steel member extending within said tubular member and substantially filling and outwardly stressing the same.

In testimony whereof I affix my signature.

STEPHEN F. BORKEY.